Dec. 11, 1951  F. V. TOOLEY  2,578,110
PRODUCTION OF GLASS
Filed Oct. 14, 1944
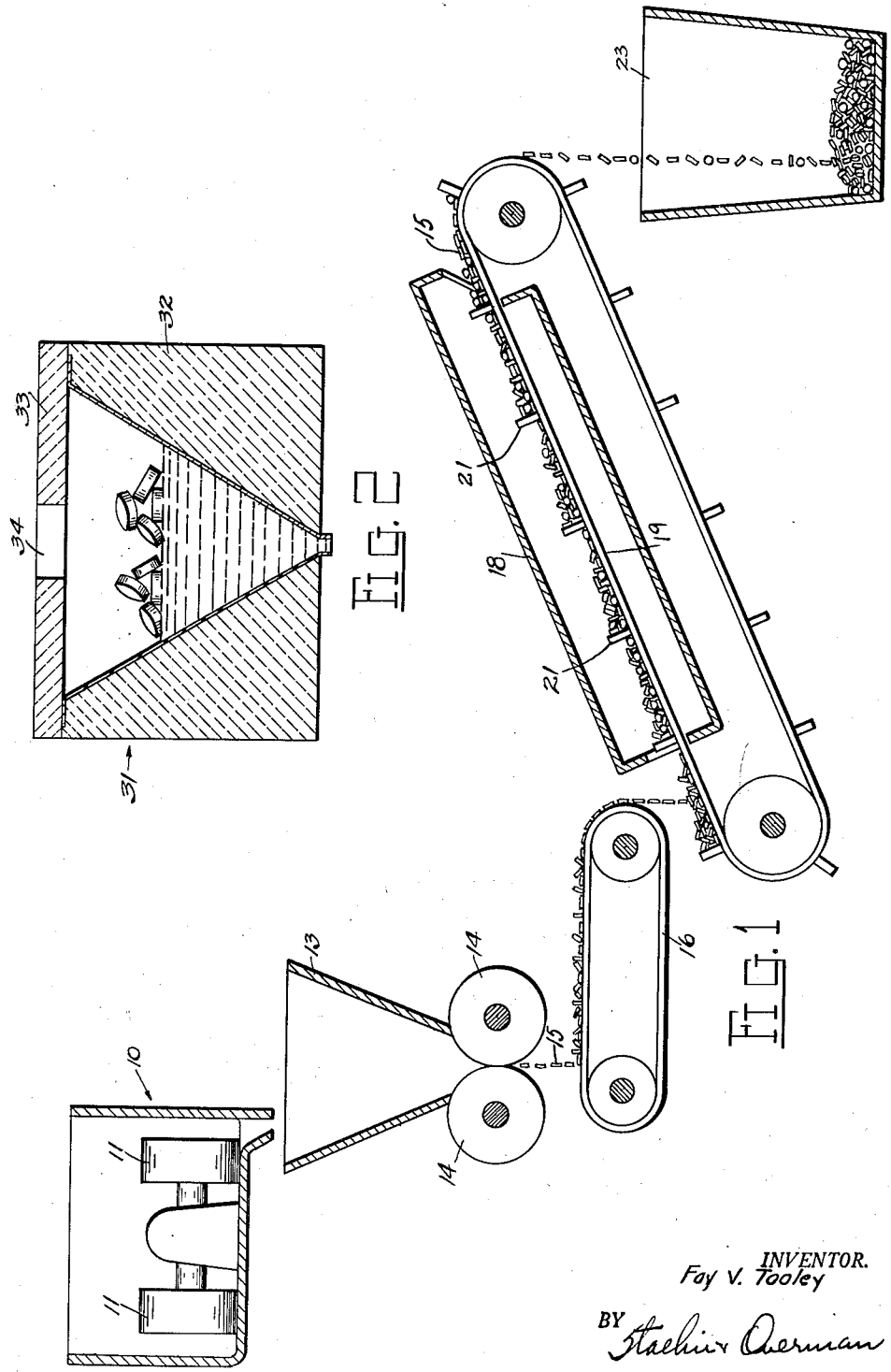
INVENTOR.
Fay V. Tooley
BY
Attorneys Patented Dec. 11, 1951

2,578,110

UNITED STATES PATENT OFFICE 2,578,110

PRODUCTION OF GLASS

Fay V. Tooley, Newark, Ohio, assignor to Owens-Corning Fiberglas Corporation, a corporation of Delaware Application October 14, 1944, Serial No. 558,765

2 Claims. (Cl. 49—77)

This invention relates to the production of glass and more particularly to the treatment of batch material and its conversion into molten glass.

In the production of glass it is common practice to feed glass batch consisting of a mixture of various ingredients such as silica in the form of sand, soda, and lime, and with or without other suitable materials including fluxes and coloring agents, into a tank and heating the batch to the melting temperature. The batch constituents are ordinarily of a particle size resulting in a relatively coarse batch, 50 to 60% of which will pass through a screen having less than 100 meshes to the inch and a considerable portion of the balance of which will often be coarser. Often a small portion of the batch may be finer than this but the batch is predominantly coarse. Following this manner of melting it generally requires in the neighborhood of 20 to 36 hours or more, from the time the batch is charged into the tank to the time an approximately uniform molten glass suitable for forming operations is obtained.

It is believed one of the major reasons for this slow conversion of batch material to a uniform glass melt is that the batch itself is not completely uniform throughout. Even if the batch is thoroughly mixed before being fed into the tank, it tends to segregate, leading to a condition in which difficultly melted ingredients, such as sand, are separated from the flux materials that promote their solution during melting. This segregation may result from the vibration incident to conveying the batch to the tank or from feeding the batch into the tank. Segregation also occurs as the melting proceeds because certain materials or combinations of materials melt or go into solution first, and, in liquid form, separate from those materials last to be taken into solution. The liquid resulting from this initial melting is generally far removed from the intended composition of the finished glass, and approaches this only as rapidly as the more difficultly soluble materials, such as silica, are taken into solution.

Even after all the batch is converted to the liquid state there may be non-uniformity of the glass resulting from segregation of the batch, indicated by the presence of cords and striae. These non-uniformities are hard to eliminate because the diffusion process takes place at a low rate due to the high viscosity of molten glass. As a result striae and cords exist in the molten material unless the glass is held in molten condition for a length of time running in some cases to days, or unless some manner of mixing is resorted to. However, most mixing procedures are too costly and at the best only partially successful in attaining the desired end.

For a large number of glass products, a certain amount of striae and cords and other non-uniformities in the glass melt are tolerated because they do not interfere with some forming operations nor too severely with the properties of the final product and because the cost of removing them is prohibitive. In cases where the quality required necessitates substantial elimination of striae and cords, as in the production of optical glass, a stirring and selection process is resorted to, and the amount of glass rejected is often high.

In an effort to obviate the above difficulties, the art has attempted to use batch in which some of the constituents have been reduced to a small particle size, for instance, to a size that will pass through a 325 mesh screen and the batch is mixed to obtain uniformity. This improves the melting process to some extent but the use of fine batch introduces new problems to partially offset the total advantages that could be gained. The small particles are apt to be blown out of the tank by the products of combustion so that some of certain constituents may be lost, making it difficult to control the composition of the finished glass. The dusty nature of the batch also presents a handling problem especially if it is attempted to treat the batch in any manner prior to melting, and it also creates a health hazard.

While in the case of coarse batch material the evolution of gases from the batch has been considered to maintain to some extent the distribution of the more difficultly melted particles, I am led to the belief that with fine batch, gases bubbling up through the liquid phase of the melting batch oftentimes tend to buffet about particles of silica and other difficultly melted materials with the result that these particles tend to agglomerate and form stones. These stones adversely affect forming behavior and finished quality and can only be removed by resort to special steps in the melting process. Moreover, the introduction of gases into the glass melt may either form seeds directly or be dissolved in the glass and appear as seeds at some later time in the melting or the forming process.

While many aspects of the present invention are applicable generally to the production of all types of glass products, the invention is especially valuable in the production of glass fibers, In presently employed glass fiber processes, the molten glass is fed through small orifices and the streams emanating from the orifices are attenuated at a high rate into fine filaments. Non-uniformities of the molten glass, including stones and seeds and large striae and cords, interfere with the regular flow of the glass through the small orifices to result in interruptions in the process. These may also contribute to the production of irregular fibers.

It is a primary object of the present invention to overcome the above objections and to greatly increase the rate of conversion of glass batch to a homogeneous seed and stone-free glass melt. Ancillary objects are to lessen the amount of heat required to melt the batch, to decrease the size of the tank needed for a given output of glass, and to reduce the cost of operation.

It is a further object to employ batch of fine particle size to facilitate reduction of the batch to a homogeneous glass and at the same time to prevent segregation of the batch and condition the batch to facilitate its handling and treatment prior to melting. As a result glass of greatly improved quality is obtained and in a shorter melting period than it was heretofore possible to obtain ordinary commercial grades of glass.

In accordance with the present invention the various batch ingredients are either processed or so selected that at least the most difficultly melted materials, such as silica, are of a small particle size, for instance, will pass through a screen having in the neighborhood of 325 or more meshes per inch. The batch ingredients in the desired proportions are then thoroughly mixed to a substantially homogeneous mass and are then fixed in this homogeneous condition by briquetting. The briquettes are preferably of a small size and are treated to remove the gases therefrom before the briquettes or other bodies of batch have been melted or before a sufficient liquid phase has been formed to permit moving about of batch particles not yet melted. As a result the batch constituents pass almost directly from batch to molten glass of a high degree of uniformity. The removal of the gas is effected by heat treating the briquetted batch and this treatment may take place in any one of a number of ways as set out in the following description.

In detail, the process of the present invention is carried out by selecting the batch ingredients so that at least the more difficultly melted materials are of a particle size which will pass 100% through a screen of 325 mesh and preferably finer, 50 to 60% of the particles being 20 microns or less in diameter. I have found it desirable wherever possible to select the various batch constituents in degrees of fineness varying with their rate of going into solution. As an example, silica which goes into solution more slowly than the constituents considered as fluxes, such as boric oxide, should be finer than those materials. The fineness in which the more difficultly melted particles can be obtained regulates, therefore, the degree of fineness in which the other constituents should be provided. They may, of course, be finer than called for on the basis of their melting rates but if the advantages of the invention are to be realized to fullest extent all of the batch constituents should be of the particle size determined in general by their respective rates of going into solution. In this way the batch goes almost directly into molten glass without the formation of undue liquid phase in the presence of a solid phase with attendant difficulties.

The fine batch is thoroughly mixed in suitable manner and most effectively by using a mechanical mixer of the muller type or a ball mill, employing grinding pebbles that do not introduce any contamination due to spalling. It is then moistened by the addition of approximately 3 to 20% or more of water by weight of the batch. The amount of water varies with the batch composition and with the manner of subsequent treatment of the batch. Batches containing clay may require the addition of more water and up to 60% if the clay batches are formed into briquettes by extrusion. Generally, extrusion requires a wetter batch than if the briquettes are molded. Also, contrary to what might be expected, carbonate-type batches generally require less water than hydrate-type batches. Further for the same raw materials and the same batch, the amount of water required will increase with increasing fineness of the batch. A binding material such as glucose, bentonite and the like may be added if desired although it is not usually necessary, and in some cases resins or plastics may be employed as the binding material.

The mixed and moistened batch is then formed into briquettes by means of an ordinary briquetting press, or by an extrusion press or other shaping and molding means. The briquettes are preferably spherical or ovate bodies, or disk-like pills of less than one-half inch across their largest dimension. Such dimensions are in the interest of economical forming of the briquettes and may with advantages in melting be very much less.

Uniformity as to size, shape and weight of the briquettes is particularly desirable in order to obtain a rapid and thorough heating and melting. An important feature regulating the size of the briquettes or pills is the rapidity with which a melting temperature is achieved in the geometric center of the pill. If the pill is too large, its inner portion will remain for too long a period in a condition characterized by the presence of a liquid phase sufficient to permit migration of the more difficulty meltable portions of the batch thus inducing undesirable segregation. Hence it is desirable to have the pills or briquettes as small as possible, consistent with general overall operating conditions and economies. In this connection, the briquetting of fine batch is advantageous since fine grains will be in intimate contact due to their small size and more readily absorb and transmit heat to their interior so that a uniform heating is accomplished.

The consolidated batch, whether in spherical or ovate bodies, or in the form of disks or pills, all of which are intended to be included in the term briquette, contain after they are formed about 3 to 20% (3 to 60% if extruded) free moisture. They are now heated to remove all of the water, both free and chemically combined and the major portion of the gases, principally $CO_2$, evolved upon application of a relatively high heat to the briquettes. This is done effectively by passing the briquettes as they feed from the press through an oven heated to 800 to 1750° F. and arranged to subject the briquettes to this temperature for a period of from 30 to 180 minutes depending on the batch composition and type of raw materials employed. It is extremely important when heat treating a glass batch within the above temperature range that the treatment be stopped just before the batch reaches a soft or sticky condition, i. e., before sufficient liquid phase is produced to permit movement within the body of the more difficultly meltable batch constituents, which condition causes undesirable segregation and defeats the object of the invention. I have discovered that if the briquettes are heat treated at a temperature in the neighborhood of the upper part of the above range, they display practically no tendency to take up water while stored. Also, the heat treatment calcines or partially vitrifies the briquettes into coherent bodies which prevents dusting during subsequent handling.

This temperature and time may be varied for different types of batches, the result sought being to remove substantially all the gas at the lowest possible temperature. This temperature should be insufficient to soften the batch to a point completely destroying the naturally porous condition of the briquettes and it should be insufficient to glaze over the surface of the briquette to an extent resulting in a substantially continuous impervious vitrified coating on the briquette, which would prevent escape of the gases. Of course, after all gas has been evolved from the batch, the glazing over of the briquette is not detrimental. This heat treatment may result in slight melting of the more readily meltable constituents and the scanty liquid phase thus created will bond the unmelted material together when the batch has cooled. But the liquid phase resulting from the heat treatment should be insufficient at any time to permit relative movement of unmelted batch particles.

While I have previously stated generally the time required for heat treating the briquettes the actual time will vary according to the particular batch constituents and batch used, and will depend on the degassing and melting characteristics of each particular batch. The gases in the briquette body will of course be lost at a greater or lesser rate according to the temperature employed for heat treating, and this temperature will for the sake of highest efficiency be the highest temperature that can be employed without producing more than the scanty liquid phase previously discussed.

Briquettes treated in this manner may be fed by any desired procedure into a melting tank and when exposed to a melting temperature will be converted to molten glass of a high degree of uniformity within a period of time as small as 5 to 20 minutes with small quantities of batch, and even in very large quantities will be melted to a stone-free glass much more rapidly than most conventional batches heretofore used. A suitable melting temperature for most types of batches has been found to be about 2700° F. At this high degree of heat the melting of the briquettes is accomplished in a relatively short space of time.

One important principle to be followed in obtaining a completely seed-free glass from the briquetted batch lies in the manner of feeding them to the melting chamber. In order to obtain the maximum results of the invention the briquettes are fed in a manner to form a layer of minimum thickness on the surface of the molten pool of previously formed glass; that is, the briquettes should not be covered to a depth sufficient to prevent uniform penetration of heat into all the briquettes substantially simultaneously, or to entrap residual gases liberated upon final melting.

One other important element should preferably be considered in finally reducing the batch to a molten state, namely, that the object of producing a homogeneous seed-free glass at a heretofore unrealized rate, is more fully achieved when the temperature range between the heat treating temperature and melting temperature is traversed as rapidly as possible. When glass batch briquettes, even though prepared in the present manner, are heated up from, for instance, room temperature, to melting temperature at a slow rate, say over a period of hours, as has heretofore been the practice, no new result is obtained. The melting action is such that during one part of the melting period a substantial liquid phase exists in the presence of a solid phase, resulting in the formation of seeds, stones, etc. due to segregation during melting. Whereas if on the contrary the difference between ambient temperature and melting temperature is traversed in a matter of a few minutes, highly uniform, seed- and stone-free glass is obtained.

It is believed that the greatly improved melting properties of batch treated according to the present invention are due to several factors in combination. The first of these is the fineness of the batch; the second is apparently that this fine batch is in the form of relatively small bonded bodies so that heated gases may readily flow through a charge of batch and bring all of the batch to melting temperature almost simultaneously; the third, that the batch is consolidated, that is, is intimately mixed and is then bonded in this homogeneous condition by calcining so that the constituents of the batch may not segregate prior to and as the batch is conveyed to and fed into the furnace, nor during melting. If such segregation were allowed to take place, the advantages flowing from the use of fine batch would not be fully realized. The fourth factor apparently resides in the heat treatment of the briquetted fine batch to remove substantially all gases prior to the previously specified degree of liquefaction of the batch. Here, again, were this heat treatment not carried out the advantages obtained from the use of fine batch and from the mixing and briquetting of this batch would be realized only in lesser degree.

Any substantial amount of gas evolving as the batch melts would bubble through the molten glass and tend to bunch the unmelted relatively more refractory particles into agglomerates that would make it necessary to prolong the heating period. The particular composition of glass employed may impose some limitations as to the extent that the batch can be degassed prior to the formation of liquid sufficient to permit relative movement of unmelted particles during further degassing; the greater the range between that temperature at which the batch will dehydrate and lose carbon dioxide and other gases, and that temperature at which a detrimental quantity of liquid will form, the greater can the possibilities of the invention be realized.

Instead of carrying out the heat treatment in the manner above described, it is possible to effect the heat treatment in conjunction with the feeding of the consolidated batch into the tank or other melting receptacle in several ways. For example, the briquetted batch may be fed by suitable means through a passage or chute leading into the tank and through which at least a portion of the products of combustion flow from the tank. The products of combustion as they flow counter to the feeding movement of the briquettes heat the briquettes up to the degassing temperature. This heating may be controlled so that substantially all of the gases are removed before the briquettes are fed into the body of molten glass in the tank.

I have found that advantages in heat conservation are experienced if as much gas as possible, both $CO_2$ and water vapor, is removed at the relatively low degassing temperatures before feeding the consolidated batch into a melting tank. Gas removed at less than about 1600° F. represents a much smaller heat loss than if the same gases are removed in the melting tank at the high temperatures therein. Accordingly, by effecting the degassing step of the present process as a pre-treatment of the batch, the total amount of heat expended both in degassing and melting may be less than that required in an ordinary melting process.

The calcining temperature used, as pointed out earlier, depends on the particular batch ingredients and batch formulation employed. The following examples illustrate the application of the heat treating phase of the present invention to glass batches selected as representative of a wide variety of characteristics.

In the case of an alkali-free borosilicate glass batch containing no carbonates, but containing aluminum hydrate and boric acid in addition to alumina and members of the RO group, the heat treating temperature may be as low as 900° to 1000° F. to effectively remove the water from the batch. However, since this temperature may be increased substantially without formation of a detrimental liquid phase, it is possible to treat batches of this type at a temperature of from 1650° to 1750° F., which higher temperature is preferable since rapid and substantially complete degasification is accomplished.

In the case of a borosilicate batch similar to that described above, but containing calcium carbonate, the preferable heat treating temperature is also from 1650° to 1750° F. At this temperature no detrimental liquid phase is formed and the temperature achieves almost complete degassing of the batch.

For a borosilicate glass containing 10 percent sodium oxide in the finished glass, and including in the batch formulation calcium carbonate, sodium carbonate, feldspar and borax, the proper calcining temperature has been found to be 1200° to 1300° F.

For a common soda-lime-silica glass ($SiO_2$ 74%, RO 10%, $Na_2O$ 16%) using sand, raw dolomite, soda ash, niter and ammonium sulfate in the batch, the proper calcining temperature has been found to be 1400° to 1450° F.

From these examples it can be seen that the temperature varies widely with the type of batch and no hard and fast rule can be laid down to cover all batches. However, simple heat treating and melting trials with any kind of batch will readily demonstrate the temperature to be employed. The point where the batch briquettes are over heated and contain a liquid phase permitting the movement of the more refractory particles can be determined by visual inspection. Generally a soft, sticky, and deformable briquette is over heated. Coupled with this test, the amount of gas removed may be determined by checking the weight lost when the heat treated briquettes are heated to melting temperature. It is then only a matter of selection to choose the highest temperature giving both the greatest degree of degasification while avoiding a soft, deformable and sticky condition of the briquettes.

One arrangement for carrying out certain aspects of the present invention is illustrated in the accompanying drawing, in which:

Figure 1 is a cross-sectional diagrammatic view of apparatus adapted to carry out the batch treating process of the present invention; and Figure 2 is a cross-sectional diagrammatic view of one type of container in which batch treated in accordance with the present invention may be melted.

Apparatus adapted to treat batch in accordance with the present invention is illustrated diagrammatically in Figure 1. A mechanical mixer of the muller type is exemplified at 10 and comprises an ordinary casing and mulling rolls 11 for mixing the batch. While in the mixer water is added to the batch and the wet batch after additional mixing is placed in the hopper 13 of a briquetting press provided with the usual briquetting rolls 14. The briquettes fed from the press are deposited on a conveyor 16 and conveyed to suitable heating apparatus.

In the present embodiment the heating apparatus comprises an oven 18 through which the upper flight of a conveyor 19 passes. The conveyor is provided with a plurality of spaced battens 21 which form pockets to receive the briquettes from the conveyor 16 and move them through the oven. From the heating apparatus the briquettes are deposited in a suitable hopper 23 and thereafter either stored or fed immediately into a glass melting tank.

Figure 2 is a diagrammatic illustration of a container for molten glass in the form of a bushing 31 of the type employed in the production of glass fibers. The bushing is usually of metal and is heated by electric current passed through its walls. A refractory block 32 surrounds the bushing and a refractory cover 33 is provided to close the top of the bushing. In the present instance, the cover is provided with a central opening 34 through which consolidated batch in the form of pills are fed downwardly into the bushing. Suitable mechanical feeding means may be provided for periodically feeding small measured amounts of briquettes into the bushing. It is desirable that the batch briquettes are not permitted to pile up and collect in multiple layers, which would prevent uniform heat penetration to all portions of the batch.

When the briquettes are fed into the melting chamber they are immediately subjected to the high heat maintained therein. It has been observed that in feeding small amounts of pills to cause them to collect in a few layers, say two or three, on the surface of the melt, there is no tendency for the pills to submerge in the molten pool but rather they float on the surface of the glass. Due to the heat of the molten glass, which should be at a temperature of about 2600° to 2700° F., and aided by the fluxing action of the molten material the temperature of the briquettes is rapidly raised to the melting point. Any gases remaining in the batch pills after heat treatment, which residuum has been determined in practice to be less than 0.5% of the batch, are immediately freed on the surface of the pool and are not carried down as seeds into the body of glass. Liberation of this small amount of remaining gases normally produces a slightly foamy condition on the surface of the pool which has been found to exist only to a depth of from ⅛ to ¼ inch, and does not, therefore, detract from obtaining a completely seed- and stone-free glass.

Various modifications and variations may be made within the spirit of the invention and the scope of the appended claims.

I claim:

1. The process of treating glass batch which comprises dividing into a plurality of bodies an intimate admixture of glass batch made up of a plurality of ingredients whose particle sizes are related to each other in inverse order to the rate at which the respective ingredients melt, each of said bodies containing all of the batch ingredients in intimate admixture, fixing the batch ingredients together in each body, and thereafter heating the bodies and removing substantially all free and combined water from the batch in said bodies and removing a substantial proportion of gas other than water vapor from the potentially gas-forming constituents of the batch in said bodies before the batch is heated to a sticky condition in which there is present a liquid phase sufficient to permit relative movement and attendant segregation of unmelted batch particles.

2. Integral bodies of glass batch each comprising an intimate admixture in pulverized form of ingredients and in which the quantities of the several ingredients are in proportions adapted when melted to produce molten glass and with the sizes of the particles of the different ingredients being related to each other in inverse order to the rate at which the respective ingredients melt, the batch of said bodies being free of substantial proportions of the gas that would normally be liberated by the potentially gas-forming constituents upon heating of the batch to melting temperature, said bodies having porous surfaces and being free of the fusion of the batch particles that results from heating the batch to a sticky condition.

FAY V. TOOLEY.

REFERENCES CITED

The following references are of record in the file of this patent:

UNITED STATES PATENTS

| Number | Name | Date |
|---|---|---|
| 1,149,451 | Kann | Aug. 10, 1915 |
| 1,543,770 | Hilbert | June 30, 1925 |
| 1,995,803 | Gilbert | Mar. 26, 1935 |
| 2,114,545 | Slayter | Apr. 19, 1938 |
| 2,214,191 | Batchell et al. | Sept. 10, 1940 |
| 2,220,750 | Bair et al. | Nov. 5, 1940 |
| 2,230,343 | Bair | Feb. 4, 1941 |
| 2,366,473 | Bair | Jan. 2, 1945 |

OTHER REFERENCES

Ceramic Abstracts, compiled by American Ceramic Society, Columbus, Ohio. Vol. 21, page 211, October 1942, abstract entitled "Mixing of Batches and Briquetting in the Glass Industry." Copy in division 38.